(12) United States Patent
Weinstein et al.

(10) Patent No.: US 8,984,082 B2
(45) Date of Patent: *Mar. 17, 2015

(54) PERSONALIZATION BASED UPON SOCIAL VALUE IN ONLINE MEDIA

(71) Applicant: Wetpaint.com, Inc., Seattle, WA (US)

(72) Inventors: Alex David Weinstein, Bellevue, WA (US); Dmitry Frenkel, Bothell, WA (US)

(73) Assignee: Wetpaint.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,406

(22) Filed: Jun. 23, 2014

(65) Prior Publication Data

US 2015/0039609 A1 Feb. 5, 2015

Related U.S. Application Data

(63) Continuation of application No. 13/967,976, filed on Aug. 15, 2013, now Pat. No. 8,762,472.

(60) Provisional application No. 61/694,404, filed on Aug. 29, 2012.

(51) Int. Cl.
*G06F 15/16* (2006.01)
*G06F 17/30* (2006.01)

(52) U.S. Cl.
CPC .... *G06F 17/30867* (2013.01); *G06F 17/30595* (2013.01)
USPC ............................ 709/206; 709/204; 709/205

(58) Field of Classification Search
CPC ... H04L 12/585; G06F 15/173; G06Q 10/107

USPC .......................................................... 709/206
See application file for complete search history.

(56) References Cited

U.S. PATENT DOCUMENTS 7,596,597 B2 * 9/2009 Liu et al. ........................ 709/204
7,647,306 B2 * 1/2010 Rose et al. ............. 707/999.003
7,673,003 B2    3/2010 Little
8,086,605 B2 * 12/2011 Xu et al. ........................ 707/732
8,171,128 B2 *  5/2012 Zuckerberg et al. .......... 709/224

(Continued)

OTHER PUBLICATIONS

International Search Report and Written Opinion for PCT/US2013/055191 mailed Dec. 16, 2013.

(Continued)

*Primary Examiner* — Tauqir Hussain
(74) *Attorney, Agent, or Firm* — John W. Branch; Lowe Graham Jones PLLC

(57) ABSTRACT

Embodiments are directed towards personalizing content to be provided to a user. A recommendation score may be determined for a piece of content for a user. The recommendation score may be based on a combination of an intrinsic value and/or a social value of the content to the user. The social value may be calculated based on a combination of an individual social value for each of the user's friends, which may be determined based on the combination of a social weight, an interest probability, and a recommendation score for the friend. Online personalization of content for a user may provide the user with the tools to be a valuable, appreciated member of the user's social network. By employing embodiments, as described herein, content may be determined and provided to a user, which may help the user gain the attention of their social circles.

30 Claims, 7 Drawing Sheets

(56) References Cited

U.S. PATENT DOCUMENTS

| | | | |
|---|---|---|---|
| 8,219,126 B2 | 7/2012 | Marlow et al. | |
| 8,312,140 B2 * | 11/2012 | Zuckerberg et al. | 709/224 |
| 8,346,864 B1 | 1/2013 | Amidon et al. | |
| 8,388,446 B1 | 3/2013 | Craine et al. | |
| 8,412,821 B2 * | 4/2013 | Zuckerberg et al. | 709/224 |
| 8,442,978 B2 * | 5/2013 | Berkhim et al. | 707/732 |
| 8,554,635 B2 * | 10/2013 | England et al. | 705/26.1 |
| 2009/0119167 A1 | 5/2009 | Kendall et al. | |
| 2011/0047479 A1 | 2/2011 | Ghosh | |
| 2011/0314030 A1 | 12/2011 | Burba et al. | |
| 2011/0320545 A1 | 12/2011 | Hammer et al. | |
| 2012/0036213 A1 | 2/2012 | Tiu, Jr. et al. | |
| 2012/0054275 A1 | 3/2012 | Channell | |
| 2012/0066073 A1 | 3/2012 | Dilip et al. | |
| 2012/0089698 A1 * | 4/2012 | Tseng | 709/217 |
| 2012/0203838 A1 | 8/2012 | Zuckerberg et al. | |
| 2012/0203846 A1 * | 8/2012 | Hull et al. | 709/206 |
| 2012/0215865 A1 | 8/2012 | Sacks et al. | |
| 2012/0239764 A1 | 9/2012 | Galbreath et al. | |
| 2013/0151639 A1 | 6/2013 | Vastardis et al. | |
| 2013/0254317 A1 | 9/2013 | Altberg et al. | |
| 2014/0006527 A1 | 1/2014 | Winter | |

OTHER PUBLICATIONS

Official Communication for U.S. Appl. No. 13/967,976 mailed Dec. 5, 2013 (9 pages).

Official Communication for U.S. Appl. No. 13/967,976 mailed Apr. 16, 2014 (6 pages).

* cited by examiner

PERSONALIZATION BASED UPON SOCIAL VALUE IN ONLINE MEDIA

RELATED APPLICATIONS

This utility patent application is a Continuation claiming the benefit under 35 U.S.C. §120 of allowed U.S. patent application Ser. No. 13/967/976 filed on Aug. 15, 2013, entitled "Personalization Based Upon Social Value in Online Media," which is a non-provisional patent application claiming the benefit under 35 U.S.C. §119(e) of U.S. Provisional Patent Application Ser. No. 61/694,404 filed on Aug. 29, 2012, entitled "Personalization Based Upon Social Value in Online Media," all of which are incorporated herein by reference.

TECHNICAL FIELD

The present invention relates generally to content management, and more particularly, to providing content to a user based on a social value recommendation score of the content for the user.

BACKGROUND

Today, online media is a world where curated content is king. Brands typically employ talented editors that become world-class experts in their fields. Their editorial voice and coverage directs the attention of millions of readers. In this world, a selection of the cover story may determine the topic of interest for millions of readers. However, this approach may lack personalization for individual readers. For example, news about a particular celebrity may be provided to a reader as a mainstream interest, even though that reader may not want to read articles about that celebrity. Sometimes, these uninterested readers quickly abandon the media property because they do not quickly see an article that is interesting to them. As a result, the loyalty of the uninterested reader to the media property and/or publisher may be diminished, leading the uninterested reader to a different media property in the future.

At the same time, not only do readers like to read articles about topics that they are interested in, but they may also read articles about other topics that their friends and/or social network may be interested in. If a reader reads an article about a topic that may be of interest to the reader's social network, then the reader may be able to talk to his/her friends about that article. As a result, the reader may appear to his/her social network as smarter, more socially valuable person. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
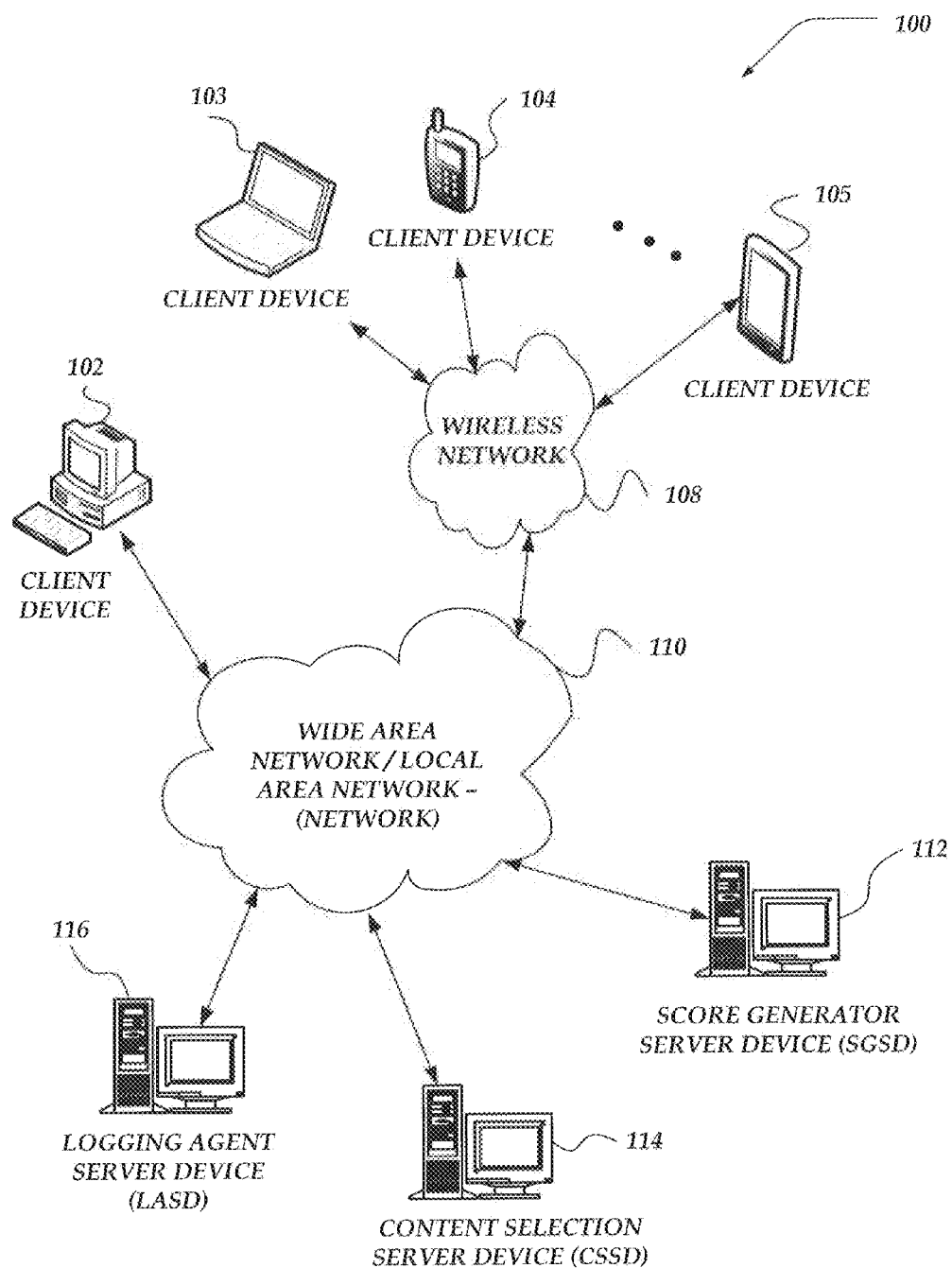
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to digital data that may be communicated over a network to be remotely displayed by a computing device. Non-exhaustive examples of content include but are not limited to articles, blogs, movies, videos, music, sounds, pictures, illustrations, graphics, images, text, or the like.

As used herein, the phrase "intrinsic value" may refer to a predictive value representative of a personal interest to a user for a given piece of content.

As used herein, the phrase, "social value" may refer to a predictive value representative of an interest to a user's social network for a given piece of content.

As used herein, the term "social network" refers to a concept of an individual's personal network of friends, family, colleagues, coworkers, and the subsequent connections within those networks. Social networks can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicate or has communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree friends and/or first-degree relationships. First-degree friends can have varying degrees of closeness, trust, and other characteristics.

Indirect personal relationships typically include relationships through first-degree friends to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree friend and/or a second-degree relationship. Similarly, a friend of a friend of a friend can be characterized as three degrees of separation or a third-degree friend. And so on.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to personalizing content to be provided to a user. In at least one embodiment, a recommendation score may be determined for a piece of content for a user. The recommendation score may be based on a combination of an intrinsic value and/or a social value of the content to the user. The intrinsic value may be the interest, enjoyment, and/or value that the user may receive from the content. The social value may be an interest to a user's social network for a given piece of content.

In some embodiments, the social value may be calculated based on a combination of an individual social value for each of the user's first degree friends. The individual social value of a friend may be determined based on the combination of a social weight, an interest probability, and a recommendation score for the friend. Accordingly, the recommendation score may be a recursive function based on the user's social network.

Online personalization of content for a user may provide the user with the tools to be a valuable, appreciated member of the user's social network. By employing embodiments, as described herein, content may be determined and provided to a user, which may help the user gain the attention of their social circles. Instead of trying to capture and direct the user's attention (e.g., by providing a user a publisher selected headline article), the publisher becomes a back-stage prompter, helping provide the user with content that may make them the center of attention among their social networks. Each time a publisher provides content to a user that can be used to make that user more valuable within his/her social network, that user's loyalty to the publisher may increase.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, Score Generator Server Device (SGSD) 112, Content Selection Server Device (CSSD) 114, and Logging Agent Server Device (LASD) 116.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, SGSD 112, CSSD 114, LASD 116, or other computing devices.

Client devices 102-105 may further be configured to include a client application that enables an end-user to log into an end-user account that may be managed by another computing device, such as SGSD 112, CSSD 114, LASD 116, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, SGSD 112, CSSD 114, LASD 116, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic RF, infrared, and other wireless media.

One embodiment of SGSD 112 is described in more detail below in conjunction with FIG. 3. Briefly, however SGSD 112 includes virtually any network device capable of determining a recommendation score of content for one or more users. In at least one embodiment, SGSD 112 may calculate the recommendation score based on a determined intrinsic value and social value of content to the user.

In some embodiments, SGSD 112 may receive possible content from CSSD 114. In other embodiments, SGSD 112 may provide CSSD 114 the determined recommendation scores. In at least one embodiment, SGSD 112 may communicate with LASD 116 to obtain historical data associated with a user, which may be utilized to determine the recommendation score of content for the user.

Devices that may be arranged to operate as SGSD 112 include various network devices, including, but not limited to personal computers, desktop computers, multiprocessor systems, microprocessor-based or programmable consumer electronics, network PCs, server devices, network appliances, and the like.

Although FIG. 1 illustrates SGSD 112 as a single computing device, the invention is not so limited. For example, one or more functions of the SGSD 112 may be distributed across one or more distinct network devices. Moreover, SGSD 112 is not limited to a particular configuration. Thus, in one embodiment, SGSD 112 may contain a plurality of network devices to generate recommendation scores for content. In another embodiment, SGSD 112 may contain a plurality of network devices that operate using a master/slave approach, where one of the plurality of network devices of SGSD 112 operates to manage and/or otherwise coordinate operations of the other network devices. In other embodiments, the SGSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged. In at least one embodiment, each of a plurality of SGSD 112 may be geographically distributed. In another embodiment, SGSD 112 may include a different computing device for monitoring tags in each of a plurality of different tag states.

One embodiment of CSSD 114 is described in more detail below in conjunction with FIG. 3. Briefly, however, CSSD 114 includes virtually any network device capable of selecting content to provide to a user based on recommendation scores of the content for the user. In at least one embodiment, CSSD 114 may provide SGSD 112 with possible content to provide to a particular user of client devices 102-105. In some embodiments, CSSD 114 may receive recommendation scores from SGSD 112 based on the particular user and the possible content. CSSD 114 may then employ the recommendation scores to determine which content to provide to the user. In at least one embodiment, CSSD 114 may rank the recommendation scores for a plurality of content to determine an order for providing content to a user. CSSD 114 may, in other embodiments, also provide other content and/or low ranked content to the user to be used to for later recommendation score generation.

Devices that may be arranged to operate as CSSD 114 include various network devices, including, but not limited to personal computers, desktop computers, multiprocessor systems, microprocessor-based or programmable consumer electronics, network PCs, server devices, network appliances, and the like.

Although FIG. 1 illustrates CSSD 114 as a single computing device, the invention is not so limited. For example, one or more functions of the CSSD 114 may be distributed across one or more distinct network devices. Moreover, CSSD 114 is not limited to a particular configuration. Thus, in one embodiment, CSSD 114 may contain a plurality of network devices to select content to provide to a user based on determined recommendation scores of the content. In another embodiment, CSSD 114 may contain a plurality of network devices that operate using a master/slave approach, where one of the plurality of network devices of CSSD 114 operates to manage and/or otherwise coordinate operations of the other network devices. In other embodiments, the CSSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged. In at least one embodiment, each of a plurality of CSSD 114 may be geographically distributed. In another embodiment, CSSD 114 may include a different computing device for monitoring tags in each of a plurality of different tag states.

One embodiment of LASD 116 is described in more detail below in conjunction with FIG. 3. Briefly, however, LASD 116 includes virtually any network device capable of logging and/or recording data associated with users of client devices 102-105. In some embodiments, the logged data may include information about whether the user accessed a particular piece of content, how long the user accessed the content, did the user share the content with another user, or the like.

In at least one embodiment, LASD 116 may collect and store data for each of a plurality of individual users. In some embodiments, LASD 116 may identify and/or distinguish users based on a unique identifier of the user, such as if the user is a subscriber to a website, a cookie previously provided to the client device of the user, a device identifier, or the like. In at least one embodiment, LASD 116 may be enabled to utilize third party subscriptions to track individual users. In some embodiments, LASD 116 may provide the logged data to SGSD 112. In some embodiments, LASD 116 and CSSD 114 may be associated with same and/or different publishers. In at least one embodiment, LASD 116 and/or CSSD 114 may be referred to and/or associated with third party publishers.

Devices that may be arranged to operate as LASD 116 include various network devices, including, but not limited to personal computers, desktop computers, multiprocessor systems, microprocessor-based or programmable consumer electronics, network PCs, server devices, network appliances, and the like. In at least one embodiment, LASD 116 may be associated with a publisher. In some embodiments, LASD 116 may include a plurality of different devices, where each device may be associated with a different publisher.

Although FIG. 1 illustrates LASD 116 as a single computing device, the invention is not so limited. For example, one or more functions of the LASD 116 may be distributed across one or move distinct network devices. Moreover, LASD 116 is not limited to a particular configuration. In another embodiment, LASD 116 may contain a plurality of network devices that operate using a master/slave approach, where one of the plurality of network devices of LASD 116 operates to manage and/or otherwise coordinate operations of the other network devices. In other embodiments, the LASD 116 may operate as a plurality of network devices within a cluster architecture, a peer-to-peer architecture, and/or even within a cloud architecture. Thus, the invention is not to be construed as being limited to a single environment, and other configurations, and architectures are also envisaged. In at least one embodiment, each of a plurality of LASD 116 may be geographically distributed. In another embodiment, LASD 116 may include a different computing device for monitoring tags in each of a plurality of different tag states.

Illustrative Client Device

Figure 2:
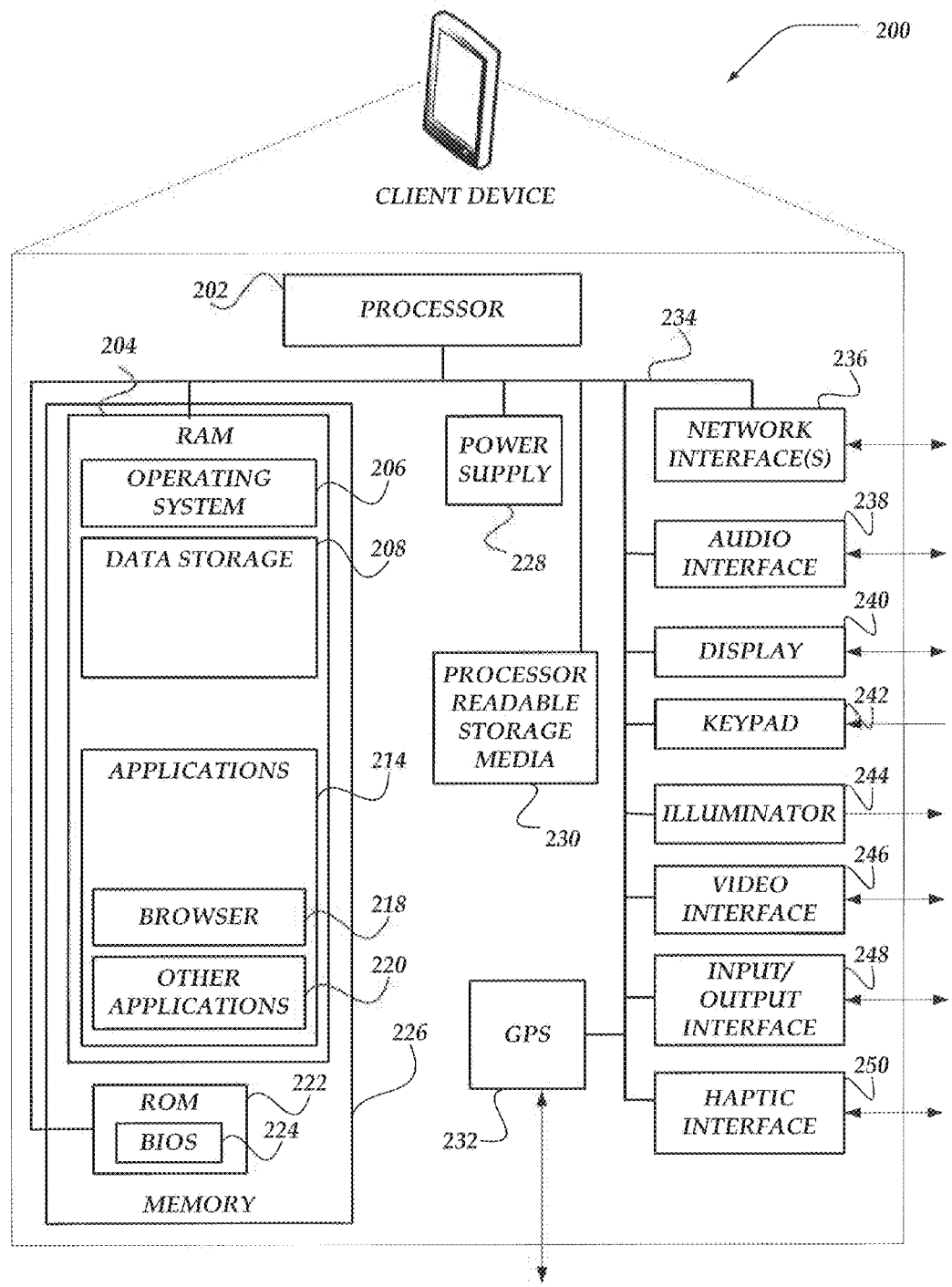
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEE 802.16 Worldwide Interoperability for Microwave Access (WiMax), session initialed protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input-output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 220 illustrates an example of computer readable storage media (devices) for storage of information such as computer readable instructions, data structures, program modules or other data. Mass memory 220 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as SGSD 112, CSSD 114, LASD 116 of FIG. 1.

Illustrative Network Device

Figure 3:
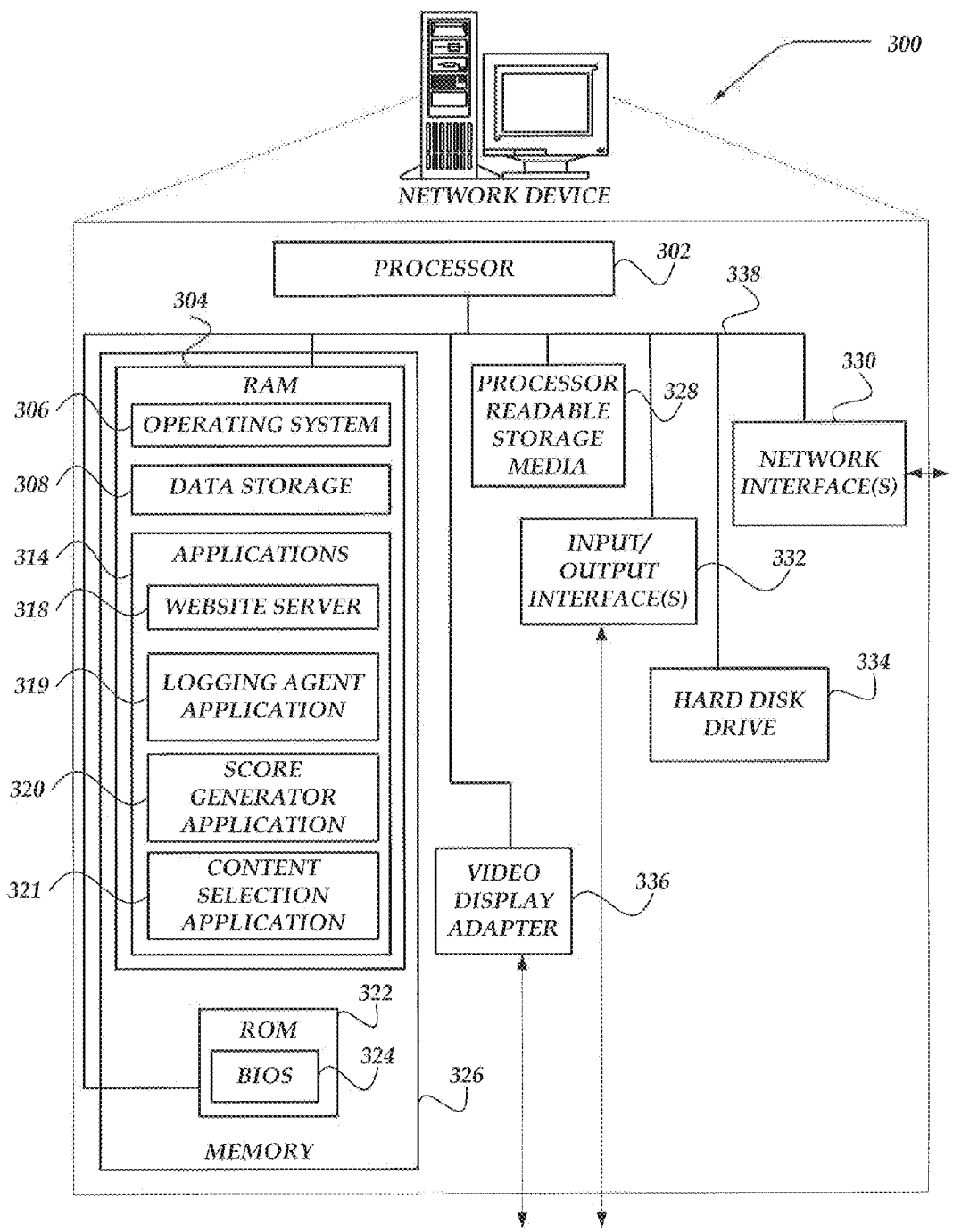
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example SGSD 112, CSSD 114, LASD 116 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input-output interface 332 for communicating with external devices, such as a keyboard, or other input or output devices not shown in FIG. 3. Input /output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/ or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media winch can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In at least one embodiment data storage 308 may include at least one state table to indicate which tags are in a particular state. In one embodiment, at least some of data store 308 might also be stored on another component of network device 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, Logging Agent Application (LAA) 319, Score Generator Application (SGA) 320, and Content Selection Application (CSA) 321.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limned to WAP, HDML, WML, SGML, HTML, XML, Compact HTML (eHTML), Extensible HTML (xHTML), or the like.

LAA 319 may be configured to collect and/or store data associated with a plurality of users, as described above in conjunction with LASD 116 of FIG. 1. In some embodiments, LAA 319 may be employed by LASD 116 of FIG. 1. In any event, LAA 319 may employ processes, or parts of processes, similar to those described in conjunction with FIGS. 4-5, to perform at least some of its actions.

SGA 320 may be configured to determine a recommendation score of content for a user, as described above in conjunction with SGSD 112 of FIG. 1. In some embodiments, SGA 320 may be employed by SGSD 112 of FIG. 1. In any event, SGA 320 may employ processes, or parts of processes, similar to those described in conjunction with FIGS. 4-5, to perform at least some of its actions.

CSA 321 may be configured to select content to provide to a user based on a recommendation score of the content, as described above in conjunction with CSSD 114 of FIG. 1. In some embodiments, CSA 321 may be employed by CSSD 114 of FIG. 1. In any event, CSA 321 may employ processes, or parts of processes, similar to those described in conjunction with FIGS. 4-5, to perform at least some of its actions.

General Operation

Figure 4:
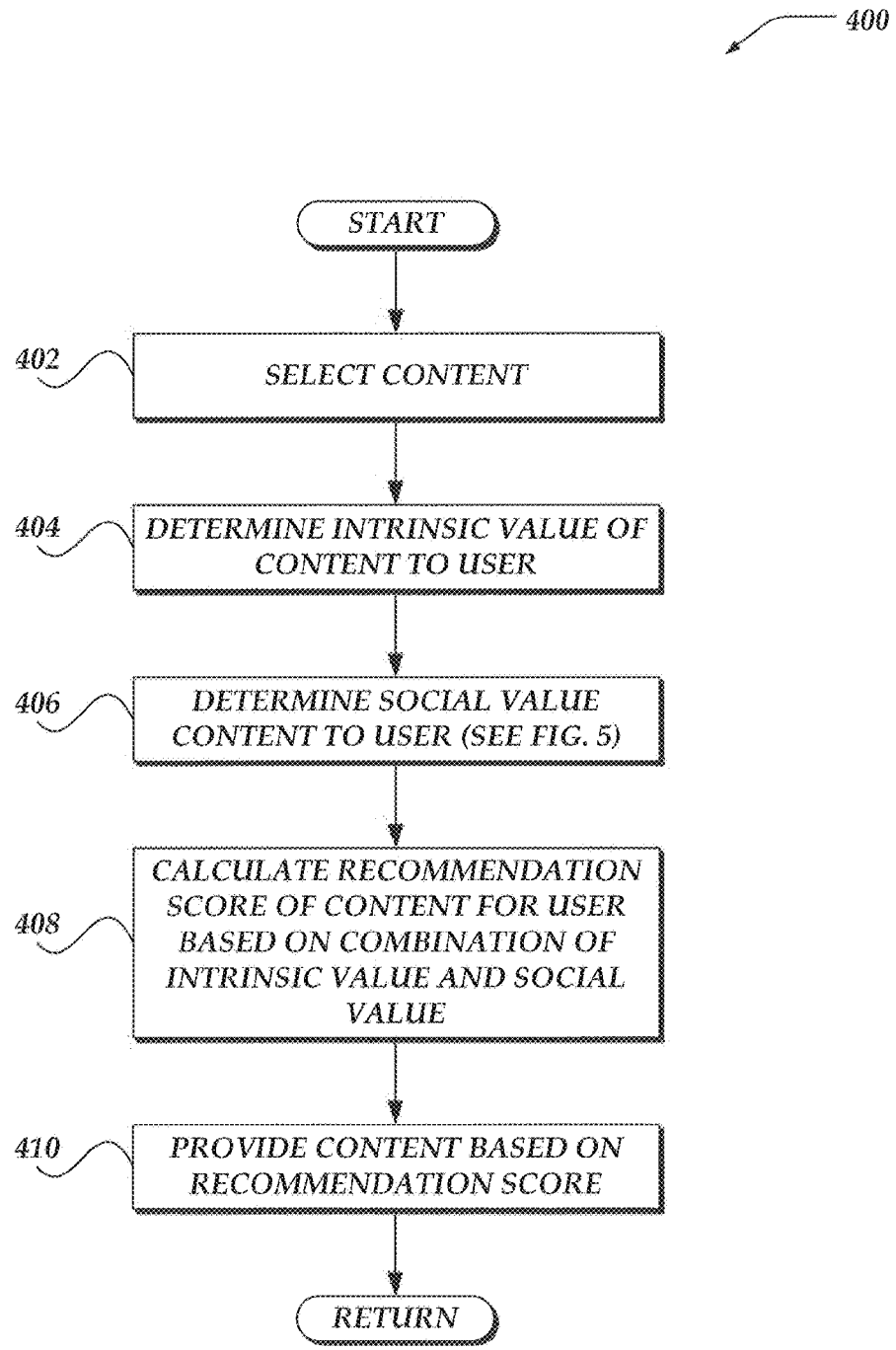
FIG. 4 illustrates a logical flow diagram generally showing one embodiment of an overview process for providing content to a user based on a recommendation score of the content for the user.

The operation of certain aspects of the invention will now be described with respect to FIGS. 4-6. FIG. 4 illustrates a logical flow diagram generally showing one embodiment of an overview process for providing content to a user based on a recommendation score of the content for the user. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where a piece of content may be selected. In at least one embodiment, the content may be selected by a publisher, editor, or the like. In some embodiments, the content may be selected from a plurality of different possible content that may be provided to a user (also referred to herein as a reader). For example, a plurality of possible content may include, but is not limited to, "today's top stories," content regarding breaking news, most popular content among readers, editorially-curated content of special importance, randomly selected content, or the like. In some embodiments, process 400 may be employed for each of the plurality of possible content that may be provided to a user. Accordingly, a subset of the plurality of possible content may be provided to the user based on a calculated recommendation score for each piece of content (as described in more detail below).

Process 400 continues at block 404, where an intrinsic value of the content may be determined. In at least one embodiment, the intrinsic value may be determined by employing one or more statistical analysis tools on historical data associated with the user. In at least one embodiment, the historical data may include previous content provided to the user and actions taken by the user on the previous content. Such actions may include, but are not limited to, clicking on the previous content, sharing the previous content, "liking" the previous content, how long the user accessed the previous content, or the like.

In some embodiments, the intrinsic value of the selected content may be calculated based on a type of action performed by the user on previous content that is similar to the selected content. In other embodiments, the intrinsic value of the selected content may be calculated based on number of times the user accessed previous content similar to the selected content. In yet other embodiments, the intrinsic value of the selected content may be calculated based on a time spent by the user accessing previous content similar to the selected content. However, embodiments are not so limited and other methods and/or algorithms may be employed to determine the intrinsic value of the content to the user. Content similar to selected content may be based on keywords within the content, a category of the content (e.g., sports, politics, or the like), type of content (e.g., news article, video, blog post, or the like), an author and/or publisher of the content, or the like, or any combination thereof.

In some other embodiments, the intrinsic value may be selected by the user, such that the intrinsic value of the selected content may be based on a category of the content and the user selected intrinsic value for that category. In at least one such embodiment, the user may be enabled to determine and/or select intrinsic values for different categories of content. For example, the user may select an intrinsic value of '1' for content categorized as political (i.e., the user is not interested in political related content) and a '9' for content categorized as sports (i.e., the user is very interested in sports related content). In other embodiments, a user may be enabled to select intrinsic values for subcategories. For example, the category of sports may include subcategories of baseball and football. In this example, the user may select an intrinsic value of '2' for baseball (i.e., the user is not interested in baseball related content) and '9.3' for football (i.e., the user is very interested in football related content). However, embodiments are not so limited and other algorithms and/or metrics may be employed to determine an intrinsic value of the selected content to the user.

Process 400 proceeds next to block 406, which is described in more detail below in conjunction with FIG. 5. Briefly, however, at block 406, a social value of the content may be determined. In at least one embodiment, the social value may be determined based on a combination of an individual social value of the selected content for each of a plurality of friends of the user.

Process 400 continues next at block 408, where a recommendation score of the content for the user may be calculated. In at least one embodiment, the recommendation score may be calculated based on a combination of the intrinsic value and the social value. In some embodiments, the intrinsic value may be added to the social value. However, embodiments are not so limited and other methods and/or algorithms may be employed for combining the intrinsic value and the social value. A use case illustration of an equation that may be employed to calculate the recommendation score of the selected content for the user is described in more detail below.

In at least one of various embodiments, an intrinsic weight may be applied to the intrinsic value. In at least one embodiment, the intrinsic weight may be multiplied by the intrinsic value. In some embodiments, employing an intrinsic weight may indicate how much the user may value the personal relevance of the selected content (i.e., the intrinsic value) compared to the social relevance of the selected content (i.e., the social value). For example, in some embodiments, the intrinsic weight may be increased if it is more important to the user to be provided articles related to the user's personal interests rather than articles related to the interests of the user's social network. However, in other embodiments, the intrinsic weight may be decreased if it is more important to the user to be provided articles related to the interest of the user's social network rather than articles related to the user's personal interests.

The intrinsic weight may be static or dynamic. In at least one embodiment, an initial intrinsic weight may be determined, such as, for example, by an operator, publisher, or the like. In one non-limiting, non-exhaustive example, the initial intrinsic weight may be determined such that the intrinsic value and the social value are equally important to the user. In some embodiments, the intrinsic weight may change over time based on how the user interacts with content. For example, if the user continuously clicks on content that has a higher social value than intrinsic value, then the social value may be more important to the user, which may result in a decrease in the intrinsic weight. However, if the user continuously clicks on content that has a higher intrinsic value than social value, then the intrinsic value may be more important to the user, which may result in an increase in the intrinsic weight.

In some other embodiments, a social weight may be applied to the social value. In at least one such embodiment, the social weight may be employed in a manner similar to the intrinsic weight. For example, the social weight may be multiplied by the social value.

In any event, process 400 continues at block 410, where the content may be provided to the user. In some embodiments, providing content to the user may include displaying the content to the user in a personalized content stream on a webpage visited by the user, the user's home page, or the like. In at least one embodiment, the content may be provided based on the calculated recommendation score. For example, the calculated recommendation score may be employed to determine whether or not to provide the selected content to the user, an order of providing the selected content along with other content to the user, or the like.

As described above, process 400 may be employed for a plurality of possible content to be provided to the user. In some embodiments, a recommendation score (as calculated at block 408) of each piece of possible content may be utilized to determine which content to provide to the user. In other embodiments, the calculated recommendation score of each piece of content may be ranked for the user. The content may be ordered and provided to the user based on the ranking of recommendation scores. For example, content with the top x number of recommendation scores (e.g., the top five recommendation scores) may be ordered and provided to the user.

In another embodiment, content with a recommendation score above a threshold value may be provided to the user. The threshold value may be determined by a user and/or an operator. In some embodiments, the threshold value may change over time based on actions by the user on content provided to the user. For example, if the user typically accesses content with a recommendation score above a particular value, then this value may be determined to be the threshold value.

In some other embodiments, content with a recommendation score that does not meet the requirements for being provided to the user (e.g., not at the top of the ranking and/or not above the recommendation score threshold value) may still be provided to the user. For example, 10-30% of the remaining content that did not make the cut may be shown to the user (e.g., in the personalized content stream). Various heuristics may be employed to determine which of the remaining content to provide to the user, including, but not limited to, content representing breaking news, editorially-curated content of special importance, most popular content, randomly selected content, or the like, or any combination thereof.

In at least one embodiment, by providing this additional content to the user, additional data may be collected and/or analyzed to dynamically modify how the recommendation score of content is calculated (e.g., modifying the intrinsic weight applied to the intrinsic value, modifying an interest probability ($P(F_i,X,U)$ as described below), modifying a weight of a friend ($a_i$ as described below), or the like.

After block 410, process 400 may return to a calling process to perform other actions.

Ideas described herein are applicable not only to online publishing; but virtually any realm where social feedback loops are involved—and are measurable—may benefit from employing embodiments of process 400, as described above. Some non-limiting, non-exhaustive examples include, but are not limited to online gaming, e-commerce, advertisement targeting, or the like.

In some embodiments, in multi-player online role playing games, a user might be suggested a particular path of character upgrades because his guild members appreciate this kind of support from their friends (where recommendations scores of character upgrades may be calculated similar to calculating recommendations scores of content as described above). For example, the intrinsic value may be a gamer's personal interest in playing a particular character, using particular skills or attributes, using particular weapons, or the like. The social value may be the interest that the gamer's friends (e.g., his guild members) have for—or the interest the gamer's friends have in the gamer using—the particular character, skills, upgrades, attributes, or the like. A recommendation store may then be determined (by employing embodiments described herein) for each of a plurality of different characters, skills, upgrades, or the like, to suggest and/or influence the gamer's character selections. These suggestions may enable gamers to create and play characters that may be most beneficial to their friends/guild as a whole.

In other embodiments, in an online shopping site that maintains a user identity, a user might be suggested a set of purchases (i.e., content) that their friends are most likely to value, based upon their prior purchases. For example, if a user's friend bought a last years' model of a product, it is likely going to be fruitful to suggest this years' model of this product to the user. In at least one example, the intrinsic value may be a purchaser's interest in a particular product, line of products, supplier, brand, or the like. The social value may be the interest that the purchaser's friends have in the particular product, line of products, supplier, brand, or the like. A recommendation score may then be determined (by employing embodiments described herein) for each of a plurality of different products, to suggest products to purchase (or provide advertisements for) such that the purchaser looks good to her friends.

By employing embodiments described above, in some other embodiments, advertisements (i.e., content) may be determined to be provided to a user. In some embodiments, those advertisements (or other content) may be provided and/or sold to one or more publishers. In at least one embodiment, a publisher may be enabled to opt out from having data collected about its users and used to generate recommendation scores of content for another publisher to provide to the other publisher's users.

Figure 5:
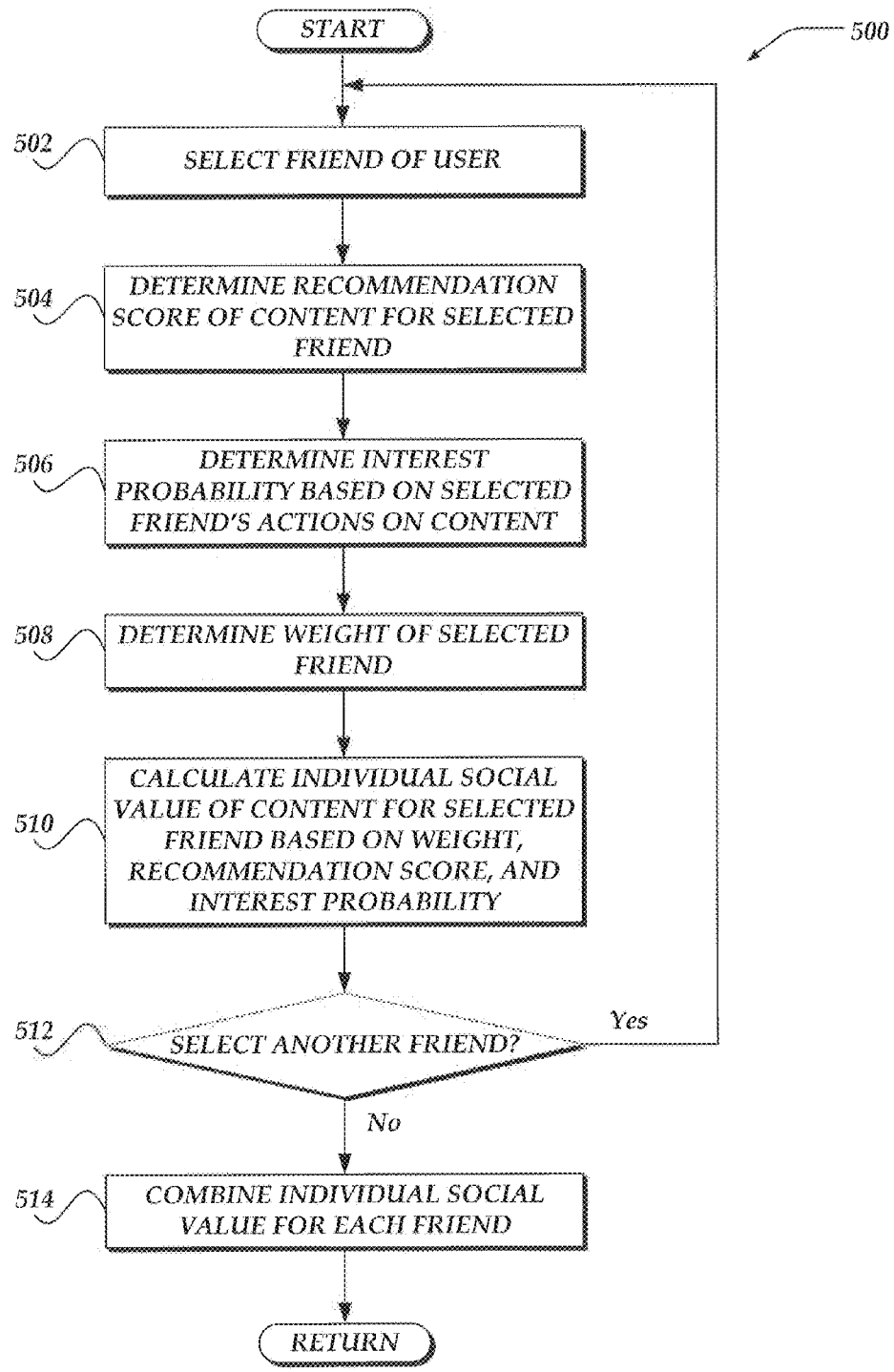
FIG. 5 illustrates a logical flow diagram generally showing one embodiment of a process for determining a social value of content to a user.

FIG. 5 illustrates a logical flow diagram generally showing one embodiment of a process for determining a social value of content to a user. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where a friend of the user may be selected. In at least one of the various embodiments, the friend may be a first-degree friend of the user's social network. In some embodiments, the friend may be selected based on a contact list of the user, other users that the user has been in contact with (e.g., send/receive emails, text messages, or other person-to-person online communications, sharing content, or the like), or the like.

Process 500 proceeds to block 504, where a recommendation score of content (i.e., the selected content at block 402 of FIG. 4) for the selected friend may be determined. In at least one embodiment, the recommendation score of the selected content for the selected friend may be determined by recursively employing blocks 404, 406, and 408 of FIG. 4 for the selected friend. Accordingly, calculating the recommendation score of the selected content for the user, as described by blocks 404, 406, and 408 of FIG. 4, may be determined by traversing one or more levels of the social network tree of the user.

In some embodiments, recommendation score for the selected friend may be recursively determined up to a predetermined degree of friends of the user. For example, recommendations scores may be recursively determined up to third-degree friends of the user. In at least one embodiment, the recommendation score for a friend at the predetermined degree of friends may be determined based on the intrinsic value (as calculated by block 404 of FIG. 4) of the content for those friends and not the social value (as calculated by block 406 of FIG. 4). For example, if the predetermined degree of friends is first-degree friends of the user, then the recommendation score of the content for the selected friend (i.e., first-degree friend) may be an intrinsic value of the content to the selected friend. In some embodiments, ending this recursive calculation may be referred to a trimming the social network tree of the user.

In any event, process 500 next proceeds to block 506, where an interest probability for the selected friend may be determined. In at least one of various embodiments, the interest probability may be a probability that the user and the selected friend will perform an action on the selected content. In some embodiments, the interest probability may be based on the selected friend performing an action on a piece of content after the user performs an action on the same piece of content. In other embodiments, the interest probability may be based on the user performing an action on a piece of content after the selected friend performs an action on the same piece of content. Actions performed on the content may include, but are not limited to, accessing the content, sharing the content, or the like.

In at least one embodiment, the interest probability for the selected friend may be determined by employing one or more statistical tools on historical data associated with the user and the selected friend. However, embodiments are not so limited and other methods and/or algorithms may be employed to determine the interest probability for the selected friend for the selected content. In some embodiments, the historical data may include actions performed by the user and the selected friend, including which content was read by the user, which friends accessed the content (e.g., if the user shared the content with the friends), or the like. In some embodiments, a unique link may be generated to share content from the user to a friend, which may be utilized to determine which friends accessed the content.

In other embodiments, the historical data may identify actions performed on different features of the content, including but not limited to, given pieces of content, types of content (e.g., videos, articles, or the like), categories of content (e.g., sports, health, or the like), authors of content, or the like. In some embodiments, the features may be determined based on a natural language search of content, tags of content, collaborative filters, or the like. In some embodiments, the historical data may indicate who performed an action on the content first, the timeframe between actions, or the like. In some embodiments, the historical data may be utilized to generate a feature to friend matrix, which may determine the interest probability for the selected content for the selected friend.

In some embodiments, the interest probability may be unique for different content features (e.g., types of content, categories of content, authors of content, or the like) for the selected friend. In other embodiments, the interest probability for the selected friend may be an average of these different feature probabilities. However, embodiments are not so limited and other methods and/or algorithms may be employed to determine the interest probability.

In any event, the interest probability for the selected friend may be static or dynamic. In at least one embodiment, the interest probability of the content and the selected friend may change over time based on actions by the friend and the user. For example, if the user tends to read the same sports articles that Friend 1 reads, then the interest probability may increase for sports articles.

Process 500 continues at block 508, where a weight (i.e., a social weight) of the selected friend may be determined. In at least one embodiment, the weight may indicate how influential the selected friend is to the user. In another embodiment, the weight may indicate how much the user values and/or appreciates the selected friend's' opinion. In some embodiments, each friend of the user (i.e., first-degree friend) may be associated with a unique weight.

In some other embodiments, the weight may indicate how influential the user is on the selected friend. In at least one such embodiment, a publisher may be able to indirectly attract additional readers by employing an increased weight if a user is very influential on a given friend. For example, if the publisher knows that the user is very influential on the selected friend, then there may be an increased likelihood that the user will tell the friend about content the user accessed, which may result in the friend later accessing the same content.

The weight of the selected friend may be static or dynamic. In at least one embodiment, the weight for each friend may be determined, such as, for example, by an operator, publisher, or the like. In one non-limiting, non-exhaustive example, the initial weight may be determined such that each friend is weighted as equally important to the user. In at least one embodiment, the weight of a friend may change (increase and/or decrease) over time based on actions by the friend and the user. For example, if the user tends to read the same articles that Friend 1 reads, then Friend 1 may be very influential to the user, which may result in an increase in the weight. In some other embodiments, the user may be enabled to select the weight of a friend. For example, the user may be enabled to indicate that Friend 2 is more influential than Friend 1, but less influential than Friend 3, and so on.

Process 500 proceeds to block 510, where the individual social value of the content for the selected friend may be calculated. In at least one of various embodiments, the individual social value for the selected friend may be calculated based on a combination of the weight (as determined at block 508), the recommendation score for the selected friend (as determined at block 504), and the interest probability for the selected friend (as determined at block 506). In some embodiments, the weight, recommendation score, and interest probability may be multiplied together.

In some embodiments, the individual social value may be an indication of the overall perception of the user within the user's social network. For example, in some situations, a user may appear smarter to his/her friends (i.e., the user's social network) if the user reads an article before the friends do and the article is of interest to the friends. In this situation, if a friend later reads the article, then the interest probability for the friends may increase for similar content, which may increase the individual social value of similar content for the friend. In other situations, a user may be more engaged in a discussion with his/her friends if the user reads an article that was also read by the friends. In both of these situations, the interest probability for friends that also access the content may increase for similar content, which may increase the individual social value of similar content for the friend.

In any event, process 500 contains at decision block 512, where a determination may be made whether to select another friend of the user. In some embodiments, another friend may be selected until all first degree friends of the user have been selected. In at least one of various embodiments, a user's friends may be grouped into subsets of friends, such as, but not limited to, school friends, online social friends, work friends, family members, or the like. In one such embodiment, another friend may be selected until a subset of the first-degree friends of the user has been selected. If another friend may be selected, then process 500 may loop to block 502 to select another friend; otherwise, process 500 may flow to block 514.

At block 514, the individual social value for each friend may be combined to calculate the social value of the content to the user. In some embodiments, the social value may be the sum of the individual social value of each first-degree friend of the user.

After block 514, process 500 may return to a calling process to perform other actions.

Figure 6:
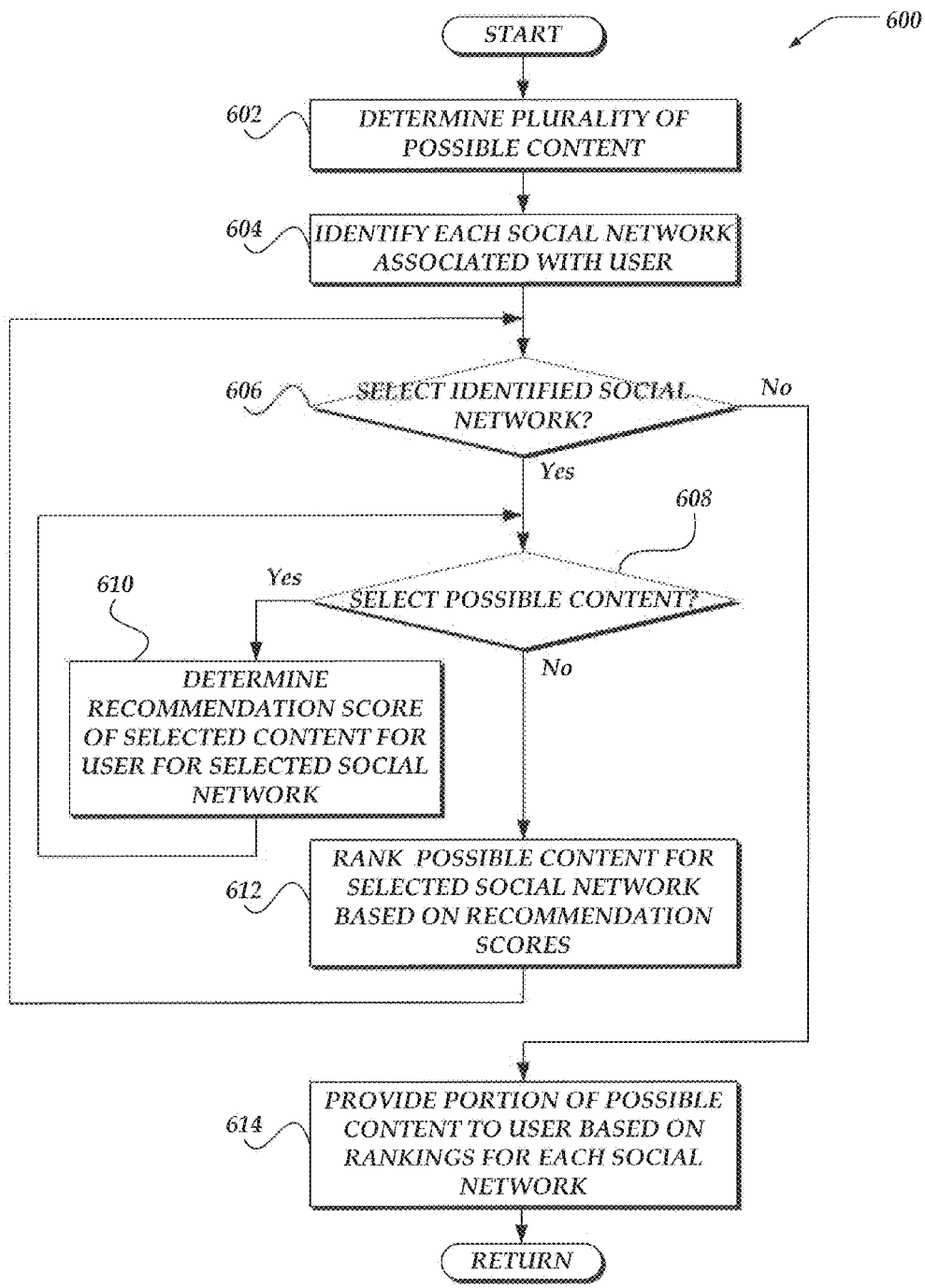
FIG. 6 illustrates a logical flow diagram generally showing one embodiment of a process for determining content to provide to a user.

FIG. 6 illustrates a logical flow diagram generally showing one embodiment of a process for determining content to provide to a user. In some embodiments, process 600 of FIG. 6 may be implemented by and/or executed on a single network device, such as network device 300 of FIG. 3. In other embodiments, process 600 or portions of process 600 of FIG. 6 or may be implemented by and/or executed on a plurality of network devices, such as network device 300 of FIG. 3.

Process 600 begins, after a start block, at block 602, where a plurality of possible content may be determined. In some embodiments, the plurality of possible content may be selected by a publisher, editor, or the like. In at least one embodiment, the possible content may include content that can be provided to a user at a particular time, for a particular day, when a user accesses a channel, or the like. Examples of the plurality of possible content may include, but are not limited to, "today's top stories," content regarding breaking news, most popular content among readers, editorially-curated content of special importance, randomly selected content, or the like.

In at least one of various embodiments, the plurality of possible content may include content associated with a plurality of different categories, such as, for example, sports, politics, economics, and the like. In at least one such embodiment, each category may include sub-categories. For example, the sports category may include sub-categories for different types of sports (e.g., tennis, basketball, football, or the like).

Process proceeds to block 604, where one or more social networks associated with the user may be identified. These social networks may include, but are not limited to, family network, work network, college network, close personal friend network, or the like. In some embodiments, these different social networks may be determined by the user (e.g., if the user identifies which friends are members of which social network).

In other embodiments, the different social networks may be automatically determined based on clusters of friends. For example, various clustering algorithms may be employed to determine one or more social networks based on a correlation of friends and friends of friends (e.g., users A, B and C may be clustered into a same social network if user A is friends with users B and C, and user B is friends with user C. However, embodiments are not so limited, and other algorithms and/or mechanisms may be employed to determine and/or identify the users one or more social networks. It should be recognized that friends of the user may be members of more than one social network of the user.

Process 600 continues at decision block 606, where one of the identified social networks may be selected. In some embodiments, each different social network may be separately selected, such that each social network associated with the user may be selected once. If an identified social network is selected, then process 600 may flow to decision block 608 for the selected social network; otherwise, process 600 may flow to block 614.

At decision block 608, possible content may be selected. In some embodiments, each of the plurality of possible content may be separately selected, such that each piece of content may be selected once for each separate social network. If a possible content is selected, then process 600 may flow to block 610; otherwise, process 600 may flow to block 612.

At block 610, a recommendation score of the selected content may be determined for the user for the selected social network. In at least one of various embodiments, block 610 may employ embodiments of blocks 404, 406, and 408 of FIG. 4 to determine the recommendation score of the selected content. Since each piece of content may be selected for each social network, each piece of possible content may have a separate recommendation score determined for each corresponding social network. After block 610, process 600 may loop to decision block 608 to select another piece of possible content.

If, at decision block 608, another piece of possible content is not selected, then process 600 may flow from decision block 608 to block 612. At block 612, the plurality of possible content may be rank ordered based on the determined recommendation scores for the selected social network. After block 612, process 600 may loop to decision block 606 to select another identified social network.

If, at decision block 606, another social network of the user is not selected, then process 600 may proceed from decision block 606 to block 614. At block 614, a portion of the possible content may be provided to the use. In various embodiments, one or more pieces of ranked content for each social network may be provided to the user. In some embodiments, a predetermined number of top ranked possible content for each social network (e.g., top two ranked pieces of content for each social network) may be provided to the user. For example, the user may be provided two pieces of content with a highest rank for their work network, two other pieces of content with a highest rank for their family network, and so on. Since various social networks may have different social interests, such embodiments may allow a user to view content that is most valuable and/or applicable to the interests (e.g., highest ranking) of each of the different social networks of the user.

In other embodiments, the number of pieces of content to provide to the user for each social network may be determined based on a user's interests and/or weights for each social network. In at least one embodiment, these social network weights may be determined by the user. For example, the user may indicate that he would like to receive four highest-ranked pieces of content for his work network and two highest-ranked pieces of content for his family network. In at least one such embodiment, the user may assign a higher social network weight to his work network than to his family network.

In another embodiment, the social network weights may be determined based on actions performed by the user. For example, if the user views more content associated with his close personal friend network, than his work network, then the close personal friend network may be assigned a higher weight than their work network.

However, embodiments are not so limited and other mechanisms and/or algorithms may be employed to determine which of the ranked content for each social network may be provided to the user. For example, in other embodiments, content that is ranked above a predetermined threshold ranking (e.g., top five ranking) for a plurality of different social networks may be provided to the user. Such an embodiment may provide content to the user that is applicable to multiple social networks of the user. The various embodiments described herein may enable a user to receive more content that is relevant to specific social networks than other social networks, but may still receive content that is relevant to at least some of the other social networks.

After block 614, process 600 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some or the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks of combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combination of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Case Recommendation Score Algorithm

As described above, a recommendation score (which may also be referred to as a Social Value Recommendation Score) may be determined for a given piece of content for a particular user. An embodiment for determining the Social Value Recommendation Score may be recursively defined as:

$$S(X, U) = a_0 * N(X, U) + \sum_{i=1}^{n} (a_i * P(F_i, X, U) * S(X, F_i))$$

where, each component of the equation is described in more detail below.

X may refer to a given piece of content. In some embodiments, content X may be content that may be provided to user U, such as content displayed on a homepage (or other webpage) of user U.

U may refer to a particular user that may be enabled to access content X. In some embodiments, the S(X,U), as described above, may be determined for content X when user U accesses a webpage. In some embodiments user U may be identified when the user logs into a webpage, based on a cookie or other unique identifier, or the like.

S(X,U) may be the Social Value Recommendation Score assigned to content X for user U. Embodiments may be employed to maximize S(X,U) with respect to parameters $a_i$ and/or $a_0$ using a known training set of data. In at least one embodiment, the training set of data may include content (e.g., content X) and/or a social graph of users. In some embodiments, the social graph of users may include friends of user U, which may include first degree friends, second degree friends, or the like. In various embodiments, the overall score may be a function that determines how to combine scores (S(X,U)) of each of the user's friends by employing weights $a_i$ and the intrinsic value (N(X,U)) to the user.

N(X,U) may be the intrinsic value that user U obtains from content X. In at least one embodiment, N(X,U) may be calculated by employing embodiments of block 404 of FIG. 4. In some embodiments, the intrinsic value may be calculated based on a time spent by user U accessing content similar to content X. In other embodiments, the intrinsic value may be calculated based on a number of times user U may share content similar to content X. In some embodiments content similar to content X may be based on keywords within the content, a category of the content (e.g., sports, politics, or the like), type of content (e.g., news article, video, blog post, or the like), or the like, or any combination thereof.

$a_0$ may be the weigh of the intrinsic value for user U. In some embodiments, a user may be impacted greater by the intrinsic value (N(X,U)) (i.e., the intrinsic value may be more important to the user) than the social value and thus, may have a higher value of $a_0$, than a user who may be impacted more by the social perception (i.e., the social value) than the intrinsic value.

n may be the number of friends that user U has. In at least one embodiment, n may be the number of first-degree friends in the social network of user U.

$F_i$ may be each friend of user U. In at least one embodiment, $F_i$ may be each first degree friend of user U.

$\sum_{i=1}^{n}(a_i*P(F_i,X,U)*S(X,F_i))$ may be the social value of friends $F_i$ of user U for content X. In at least one embodiment, this social value may be calculated by employing embodiments of block 406 of FIG. 4. In some embodiments, $a_i*P(F_i,X,U)*S(X,F_i)$ may be referred to as the individual social value of content X for friend $F_i$.

$S(X,F_i)$ may be the Social Value Recommendation Score assigned to content X for friend $F_i$. In at least one embodiment, $S(X,F_i)$ may be calculated by employing embodiments of block 504 of FIG. 4, which may include employing embodiments of blocks 404, 406, and 408 of FIG. 4, where $F_i$ is the user (i.e., user U in the recommendation score equation above).

$P(F_i,X,U)$ may be the probability that user U will be interested in and/or will access content X after friend $F_i$ accesses content X. In at least one embodiment, this probability may be calculated by employing embodiments of block 506 of FIG. 5. In some embodiments, the probability may be determined from mining historical behavior of user U in response to actions of friend $F_i$, combined with factor analysis of content similar to content X.

$a_i$ may be the weight of how influential friend $F_i$ is to user U. In at least one embodiment, $a_i$ may be calculated by employing embodiments of block 508 of FIG. 5. In some embodiments, one or more of friends $F_i$ may be more influential to user U, which may have more impact on the overall score (S(X,U)), than less influential friends. For example, a friend that is closer to user U in the offline world may be more influential and have a higher weight $a_i$, than an online-only friend.

In some embodiments, $S(X,F_i)$ may be specified using a linear combination of weights, such as described above. In other embodiments, $S(X,F_i)$ may be based on and/or include second and higher order effects into the intrinsic value placed by the user's friends. At least one such embodiment may model the fact that if several of friends $F_i$ are interested in topic T, then there may be a non-linear return on investment for user U to become knowledgeable and/or share content X that covers topic T.

As described above, $S(X,F_i)$ may be recursively calculated. In some embodiments, the function may be recursively performed a predetermined number of times (i.e., prune the tree of social value after a certain number of recursive steps away from the original user). In at least one embodiment, the number of time $S(X,F_i)$ may recursively be performed may be determine experimentally for a given social graph, by performing a statistical evaluation of a given social graph, or the like. For example, in one embodiment, a contribution of each time $S(X,F_i)$ is recursively performed may be calculated. $S(X,F_i)$ may continue to be recursively performed until the calculated contribution is less than a threshold value. In some embodiments, the more recursive steps performed, the more computationally expensive the algorithm may become. In at least one embodiment, probabilities $P(F_i,X,U)$ and social weights $a_i$ may be values bounded by 0 and 1. In such an embodiment, each recursive step away from user U may provide less and less incremental value to $S(X,F_i)$, which may result in $S(X,F_i)$ converging on a particular value (e.g., when the calculated contribution is less than a defined threshold value).

Illustrative Use Case Social Network

Figure 7:
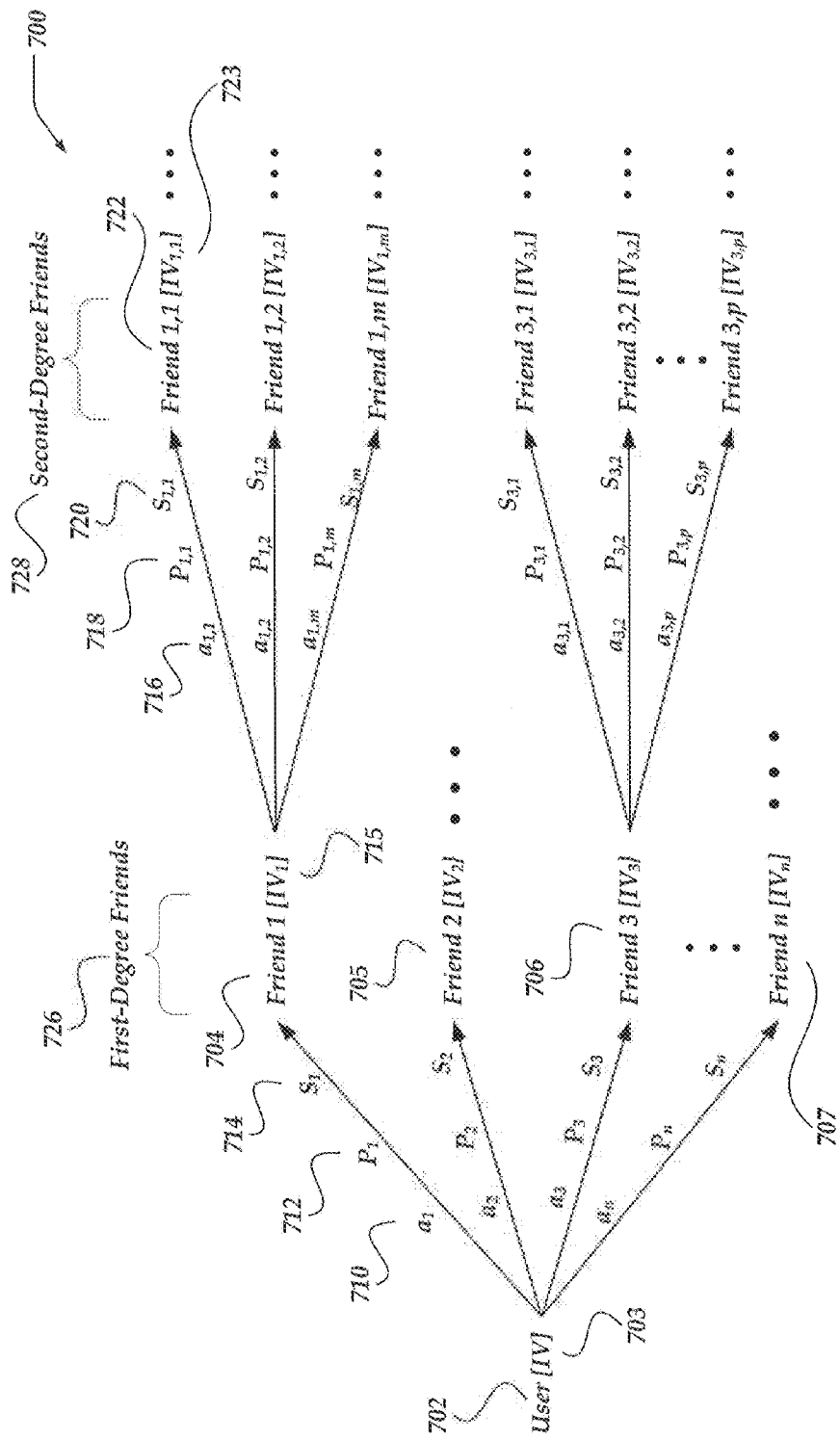
FIG. 7 illustrates a use case embodiment of a social network of a user that may be utilized to determine a recommendation score for a user.

FIG. 7 illustrates a use case embodiment of a social network of a user that may be utilized to determine a recommendation score for a user. Social network 700 may be a tree of friends of user 702. Social network 700 may include user 702, first-degree friends 726 and second-degree friends 726. First-degree friends 726 may be first-degree friends of user 702 and may include friends 704-707. Second-degree friends 728 may be second-degree friends of user 702. Although only two degrees of friends are illustrated, additional degrees of friends may also be employed.

As described above, a recommendation score of content for user 702 may be calculated based on a combination of an intrinsic value and a social value. The intrinsic value for user 702 may include intrinsic value 703, which may be an embodiment of N(X,U), as described above. The social value for user 702 may be calculated based on a combination of an individual social value for each of the user's friends (friends 704-707). The individual social value for each friend may be determined based on a combination of a social weight, an interest probability, and a recommendation score. As illustrated, each friend may be associated with a unique social weight, interest probability, and/or recommendation score for the given content.

For example, the individual social value for friend 704 may be calculated based on a combination of weight 710, interest probability 712, and recommendation score 714. Weight 710 may be an embodiment of $a_i$, as described above. Interest probability may be an embodiment of $P(F_i,X,U)$, as described above. Recommendation score 714 may be an embodiment of $S(X,F_i)$, as described above.

In some embodiments, recommendation score 714 may be determined for friend 704 by combining intrinsic value 715 for friend 704 (e.g., as determined at block 404 of FIG. 4) and a social value of the content to friend 704 (e.g., as determined at block 406 of FIG. 4). As described above, the social value for user 704 may be calculated based on a combination of an individual social value for each friend of friend 704 (including friend 722). The individual social value for friend 722 may be determined based on a combination of weight 716, interest probability 718, and recommendation score 720. Although FIG. 7 illustrates ellipses to indicate additional degrees of separation from user 702, embodiments may be constrained to a predetermined degree of separation. If the recursive function for determining the recommendation score for user 702 is stopped at second-degree friends 728, then recommendation score 720 may be based on intrinsic value 723 for friend 722.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing a plurality of content for display to a user, wherein at least one network computer enables actions to be performed, comprising:
   identifying at least one social network associated with the user; and
   for each of the at least one social network, determining a recommendation score for each of a plurality of content for the user, wherein the recommendation score for a content is based on at least a combination of individual recommendation scores for the content for each friend in an identified social network, wherein the individual recommendation score is recursively determined to a predetermined degree of separation from the user in the identified social network; and
   providing a subset of the plurality of content to the user based on the recommendation score of each of the plurality of content for each of the at least one social network.

2. The method of claim 1, wherein providing the subset of the plurality of content to the user further comprises:
   ranking the plurality of content separately for each of the at least one social network based on the recommendation scores of each of the plurality of content; and
   providing a predetermined number of highest ranking content for each social channel to the user.

3. The method of claim 1, further comprising determining the subset of the plurality of content based on a weight of each of the at least one social network and the recommendations scores for the plurality of content for each of the at least one social network.

4. The method of claim 1, wherein the recommendation score of content for a social network is based on a combination of an intrinsic value of the content to the user and a social value of the content that is based on the combination of the individual recommendation scores for each friend in the social network.

5. The method of claim 1, wherein determining the recommendation score of content for a social network further comprises, weighting at least an intrinsic value based on an importance to the user of the user's personal interests in comparison to social interests of the social network.

6. The method of claim 1, further comprising:
   determining an intrinsic value of each of the plurality of content based on at least one action that was previously taken by the user on other content that is similar to corresponding content; and
   employing the intrinsic value to determine the recommendation score.

7. The method of claim 1, wherein the individual recommendation score for each respective friend is weighted based on at least an influence of the respective friend on the user.

8. The method of claim 1, wherein the individual recommendation score for each respective friend is combined with an interest probability that both the respective friend and the user perform an action on content.

9. A network computer for managing a plurality of content for display to a user, comprising:
a memory for storing instructions; and
a processor that executes the instructions to enable actions, including:
identifying at least one social network associated with the user; and
for each of the at least one social network, determining a recommendation score for each of a plurality of content for the user, wherein the recommendation score for a content is based on at least a combination of individual recommendation scores for the content for each friend in an identified social network, wherein the individual recommendation score is recursively determined to a predetermined degree of separation from the user in the identified social network; and
providing a subset of the plurality of content to the user based on the recommendation score of each of the plurality of content for each of the at least one social network.

10. The network computer of claim 9, wherein providing the subset of the plurality of content to the user further comprises:
ranking the plurality of content separately for each of the at least one social network based on the recommendation scores of each of the plurality of content; and
providing a predetermined number of highest ranking content for each social channel to the user.

11. The network computer of claim 9, further comprising determining the subset of the plurality of content based on a weight of each of the at least one social network and the recommendation scores for the plurality of content for each of the at least one social network.

12. The network computer of claim 9, wherein the recommendation score of content for a social network is based on a combination of an intrinsic value of the content to the user and a social value of the content that is based on the combination of the individual recommendation scores for each friend in the social network.

13. The network computer of claim 9, wherein determining the recommendation score of content for a social network further comprises, weighting at least an intrinsic value based on an importance to the user of the user's personal interests in comparison to social interests of the social network.

14. The network computer of claim 9, wherein the individual recommendation score for each respective friend is weighted based on at least an influence of the respective friend on the user.

15. The network computer of claim 9, wherein the individual recommendation score for each respective friend is combined with an interest probability that both the respective friend and the user perform an action on content.

16. A processor readable non-transitory storage media that includes instructions for managing a plurality of content for display to a user, wherein execution of the instructions by a processor enables actions, comprising:
identifying at least one social network associated with the user; and
for each of the at least one social network, determining a recommendation score for each of a plurality of content for the user, wherein the recommendation score for a content is based on at least a combination of individual recommendation scores for the content for each friend in an identified social network, wherein the individual recommendation score is recursively determined to a pre- determined degree of separation from the user in the identified social network; and
providing a subset of the plurality of content to the user based on the recommendation score of each of the plurality of content for each of the at least one social network.

17. The media of claim 16, wherein providing the subset of the plurality of content to the user further comprises:
ranking the plurality of content separately for each of the at least one social network based on the recommendation scores of each of the plurality of content; and
providing a predetermined number of highest ranking content for each social channel to the user.

18. The media of claim 16, further comprising determining the subset of the plurality of content based on a weight of each of the at least one social network and the recommendations scores for the plurality of content for each of the at least one social network.

19. The media of claim 16, wherein the recommendation score of content for a social network is based on a combination of an intrinsic value of the content to the user and a social value of the content that is based on the combination of the individual recommendation scores for each friend in the social network.

20. The media of claim 16, wherein determining the recommendation score of content for a social network further comprises, weighting at least an intrinsic value based on an importance to the user of the user's personal interests in comparison to social interests of the social network.

21. The media of claim 16, wherein the individual recommendation score for each respective friend is weighted based on at least an influence of the respective friend on the user.

22. The media of claim 16, wherein the individual recommendation score for each respective friend is combined with an interest probability that both the respective friend and the user perform an action on content.

23. A system for managing a plurality of content for display to a user, comprising:
a score determination computer that is operative to identify at least one social network associated with the user, and for each of the at least one social network, determine a recommendation score for each of a plurality of content for the user, wherein the recommendation score for a content is based on at least a combination of individual recommendation scores for the content for each friend in an identified social network, wherein the individual recommendation score is recursively determined to a predetermined degree of separation from the user in the identified social network; and
a content selection computer that is operative to provide a subset of the plurality of content to the user based on the recommendation score of each of the plurality of content for each of the at least one social network.

24. The system of claim 23, wherein the content selection computer is operative to rank the plurality of content separately for each of the at least one social network based on the recommendation scores of each of the plurality of content, and to provide a predetermined number of highest ranking content for each social channel to the user.

25. The system of claim 23, wherein the content selection computer is operative to determine the subset of the plurality of content based on a weight of each of the at least one social network and the recommendations scores for the plurality of content for each of the at least one social network.

26. The system of claim 23, wherein the recommendation score of content for a social network is based on a combination of an intrinsic value of the content to the user and a social value of the content that is based on the combination of the individual recommendation scores for each friend in the social network.

27. The system of claim 23, wherein the score determination computer is operative to weight at least an intrinsic value based on an importance to the user of the user's personal interest in comparison to social interests of a social network to determine the recommendation score of content for the social network.

28. The system of claim 23, wherein the score determination computer is operative to determine an intrinsic value of each of the plurality of content based on at least one action that was previously taken by the user on other content that is similar to corresponding content, and to employ the intrinsic value to determine the recommendation score.

29. The system of claim 23, wherein the individual recommendation score for each respective friend is weighted based on at least an influence of the respective friend on the user.

30. The system of claim 23, wherein the individual recommendation score for each respective friend is combined with an interest probability that both the respective friend and the user perform an action on content.

* * * * *